United States Patent [19]

Otten et al.

[11] Patent Number: 4,991,393
[45] Date of Patent: Feb. 12, 1991

[54] SPACECRAFT GUIDANCE AND CONTROL SYSTEM

[75] Inventors: David D. Otten, Redondo Beach; Robert L. Sackheim, Rancho Palos Verdes, both of Calif.

[73] Assignee: TRW Inc., Redondo Beach, Calif.

[21] Appl. No.: 372,239

[22] Filed: Jun. 26, 1989

Related U.S. Application Data

[63] Continuation of Ser. No. 863,630, May 15, 1986, abandoned.

[51] Int. Cl.$^5$ .............................................. F02K 9/80
[52] U.S. Cl. ........................................ 60/204; 60/228; 60/233
[58] Field of Search ............... 60/39.03, 39.15, 229, 60/233, 258, 204, 228; 244/52, 76 J, 184

[56] References Cited

U.S. PATENT DOCUMENTS

| 3,097,483 | 7/1963 | Bixon et al. | 60/258 |
| 3,120,359 | 2/1964 | Sprecher | 244/52 |
| 3,231,223 | 1/1966 | Upper | 244/52 |
| 3,251,184 | 5/1966 | Sbaraglia et al. | 60/258 |
| 3,311,130 | 3/1967 | Caldwell | 60/258 |
| 3,722,219 | 3/1973 | Spencer | 60/258 |
| 4,787,201 | 11/1988 | Snow | 60/228 |

Primary Examiner—Louis J. Casaregola
Attorney, Agent, or Firm—Sol L. Goldstein

[57] ABSTRACT

Apparatus and a corresponding method for controlling the attitude of a space vehicle during operation of its propulsion engines, without gimbaling of the engines. Two engines are differentially throttled, one above and one below a nominal thrust setting of the engines, in response to an error signal indicative of the difference between an actual attitude angle and a desired attitude angle. Three or four engines can be used to control attitude about two orthogonal axes, or a greater number of engines can be used for redundancy.

8 Claims, 3 Drawing Sheets

SPACECRAFT GUIDANCE AND CONTROL SYSTEM

This application is a continuation of application Ser. No. 06/863,630, filed 5/15/86 (abandoned).

BACKGROUND OF THE INVENTION

This invention relates generally to systems for the guidance and control of a spacecraft and, more particularly, of an "upper stage" vehicle employed to carry a payload to its operational orbit. A typical application for an upper stage vehicle is to carry a satellite payload from a low-earth orbit to a geosynchronous orbit. This orbital transition is best accomplished by the use of multiple "burns" of its main rocket engines, each burn providing a desired velocity change to the vehicle. Each burn has to be made when the vehicle is appropriately oriented. Moreover, for a relatively long burn, it is important to control the attitude of the vehicle during the burn, to ensure that the desired velocity change is being imparted to the vehicle.

One approach to attitude control during powered flight is to employ one or more pairs of low-powered engines control the attitude of the vehicle. The low-powered engines perform strictly an attitude control function and the main propulsion engines provide the necessary thrust to change the velocity of the vehicle. The principal difficulty with this approach is that it imposes increased cost and complexity on the vehicle design. An alternative approach to attitude control is to mount the main engines on gimbals, so that the engines may be mechanically pivoted through a limited angular field. With an appropriate pivoting mechanism, the engines can then be used to control the attitude of the vehicle, as well as for imparting velocity changes. Although the need for low-powered engines for attitude control is eliminated by this approach, further complexity is imposed by the need for precise mechanical movement of the main engines.

Another approach that has been proposed is the pulsed modulation of multiple propulsion engines. For example, a pair of engines can be appropriately pulse modulated to control attitude about one transverse axis, such as the pitch axis. Basically, this is a duty-cycle modulation of one or both engines to provide an asymmetrical thrust and a resultant attitude correction torque. The difficulty with this approach is that the engine pulses may interact dynamically with the vehicle structures and set up harmful resonance conditions. This may be especially harmful to sensitive deployed equipment, such as antenna systems.

It will be appreciated from the foregoing that there is still a need for improvement in guidance and control systems for spacecraft. Ideally, what is needed is a system that reduces the cost and complexity of conventional systems, but still provides precise attitude control during powered flight of the vehicle. The present invention satisfies this need.

SUMMARY OF THE INVENTION

The present invention resides in apparatus, and a corresponding method for its use, for controlling the attitude of a space vehicle by varying the thrust of its main propulsion engines. Briefly, and in general terms, the apparatus of the invention includes at least two main propulsion rocket engines, and means for modulating the thrust of the engines in opposite directions, to produce a control torque on the vehicle and thereby rotate it to a desired attitude.

More specifically, the apparatus of the invention further includes means for sensing the attitude of the vehicle, means for comparing the sensed attitude with a desired attitude and generating an error signal indicative of the difference between the sensed attitude and the desired attitude, and means for coupling the error signal to the means for modulating the thrust of the engines in opposite directions. In the illustrative embodiment of the invention, the engines are of the bipropellant type and the means for modulating the engine thrust includes, for each engine, fuel and oxidizer injector valves and an electric motor coupled to the injector valves and responsive to the error signal to move the injector valves and control the rate of flow of fuel and oxidizer to the engine. The sense of the error signal is reversed in one engine as compared with the other, such that when the injector valves on one engine are further opened to increase thrust, the injector valves on the other engine are closed by an equivalent amount to reduce thrust.

In accordance with the method of the invention, the attitude of space vehicle having at least two propulsion rocket engines is controlled by the steps of sensing the true angular attitude of the vehicle, generating electrical signals indicative of the true angular attitude, providing electrical signals indicative of a desired angular attitude, and subtracting the signals indicative of desired attitude and the signals indicative of true attitude to obtain error signals. Most importantly, the method includes the step of differentially throttling the propulsion engines in opposite directions in accordance with the error signals, to apply a corrective torque to the vehicle until the error signals are reduced to practically zero.

In the method as disclosed, the step of differentially throttling the engines includes actuating a thrust modulation valve, the position of which controls the flow of fuel and oxidizer to the engine and thereby controls the thrust developed by the engine. Further, the step of actuating the thrust modulation valve includes actuating an electric motor, converting the rotational movement of the motor into transitional movement, and translating an axially movable valve element, the position of which determines the flow rate through the valve.

It will be appreciated from the foregoing that the present invention represents a significant advance in the field of guidance and control systems for space vehicles. In particular, the invention provides for the control of the attitude of a space vehicle during a burn of its propulsion engines, without the need for engine gimbaling, auxiliary thrusters for attitude control, or the use of pulsed modulation of the propulsion engines. Other aspects and advantages of the invention will become apparent from the following more detailed description, taken together with the accompanying drawings.

DESCRIPTION OF THE PREFERRED EMBODIMENT

Figure 1:
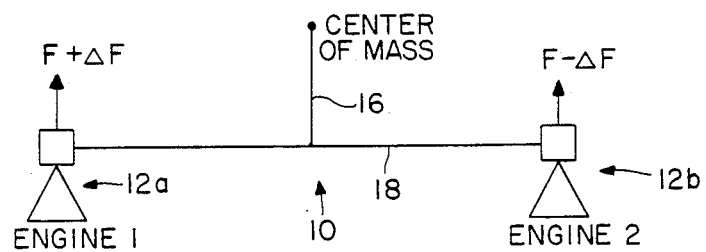
FIG. 1 is a diagrammatic representation a space vehicle propelled by two engines that are differentially throttled in accordance with the invention.

As shown in the drawings for purposes of illustration, the present invention is concerned with guidance and control systems for space vehicles. The conventional technique for controlling vehicle attitude during the burning of its propulsion engines involves the use of gimbal mountings for the engines. The principal disadvantage of this approach is its high complexity and cost. Pulsed modulation of the engines has been proposed, but it poses mechanical problems that may preclude the deployment of antenna systems during powered flight.

In accordance with the invention, vehicle attitude during a burn of the propulsion engines is controlled by differentially throttling at least two of the engines. When a desired correction must be made to the vehicle attitude, one engine is throttled back to a slightly lower thrust level and the other engine has its thrust increased by an equivalent amount. The differentially throttled engines produce a torque on the vehicle and rotate it about an axis that is orthogonal to a longitudinal axis parallel to the direction of thrust and a transverse axis passing through both engines.

FIG. 1 shows in diagrammatic form a space vehicle, indicated by reference numeral 10, having two engines 12a and 12b. The nominal thrust developed by each engine is indicated as F, and the total forward thrust developed by both engines together is 2F. When the engines are differentially throttled in accordance with the invention, the first engine 12a, for example, develops a thrust of $F+\Delta F$ and the second engine 12b develops a thrust of $F-\Delta F$, where $\Delta F$ is the differential thrust added to or subtracted from the nominal thrust F if each engine. Therefore, the vehicle will still be subject to a net forward thrust of 2F, but the vehicle will also be subject to a torque proportional to $\Delta F$ and the transverse distance between the engines. The effect of the torque will be to turn the vehicle clockwise about an axis orthogonal to the longitudinal axis 16 through the center of the vehicle, and the transverse axis 18 between the two engines 12a and 12b.

Figure 2:
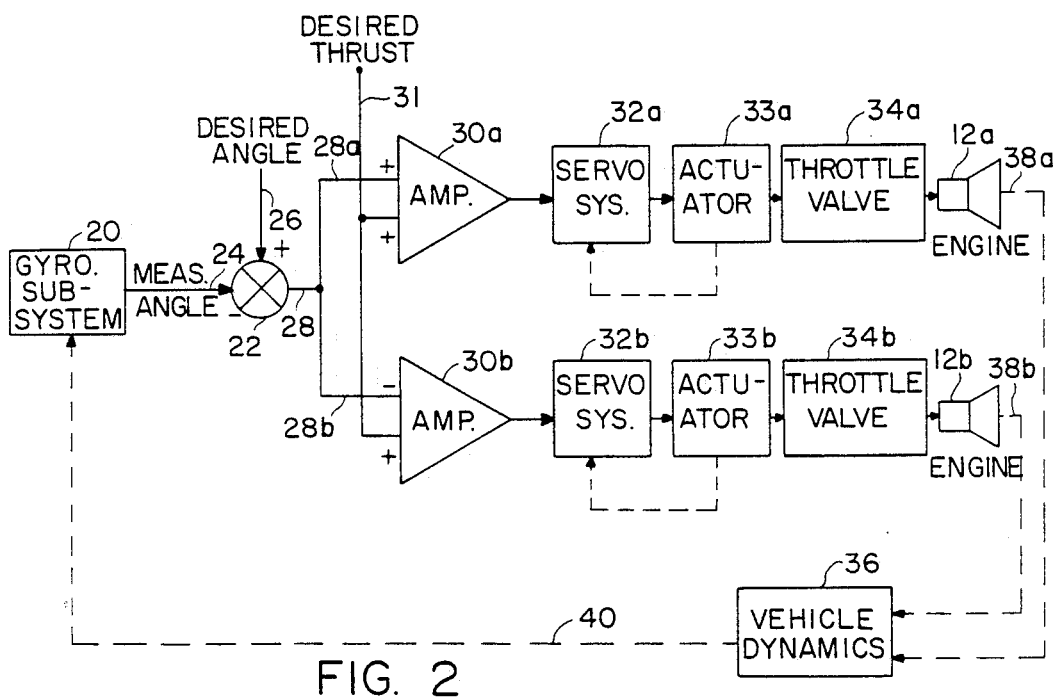
FIG. 2 is a simplified block diagram showing the control system of the invention used in conjunction with one pair of rocket propulsion engines.

FIG. 2 shows the control system of the invention in block diagram form. The system includes a gyroscopic attitude sensing subsystem 20, and a signal comparator 22, which together generate an error signal indicative of the difference between a desired attitude angle and the actual attitude angle sensed by the gyroscopic subsystem 20. The attitude signal generated by the gyroscopic subsystem 20 is transmitted over line 24 to comparator 22. The other input to the comparator 22 is a command angle signal on line 26, indicative of the desired angular attitude. The desired angle signal is derived from a guidance sustem associated with the vehicle. The nature of the guidance system is not important to the invention. Positional information used in the guidance system may be derived entirely from gyroscopic sensors, or from accelerometers, sun and earth sensors, or from ground commands.

The error signal is produced on line 28 from the comparator 22 and is bifurcated into two lines 28a and 28b and used to differentially throttle the engines 12a and 12b. The lines 28a and 28b are connected to servo amplifiers 30a and 30b, respectively, each of which has a second input line 31 carrying a signal indicative of a desired nominal thrust level for the engines. In one amplifier 30a, the error signal is added to the nominal thrust signal on line 31, and in the other amplifier 30b the error signal is subtracted from the nominal thrust signal. The outputs of the amplifiers 30a and 30b are coupled to actuator servo systems 32a and 32b, which are, in turn coupled to actuators 33a and 33b, respectively. The servo systems 32a and 32b drive the actuators 33a and 33b to positions corresponding to the input signals from the amplifiers 30a and 30b. Not shown, but implied by this representation is a feedback signal from each actuator, of form the valve it controls, back to the corresponding servo system. Some applications will require such feedback and some will not, depending on the attitude reference selected. Bascially, the servo systems 32a, 32b function in a conventional manner to drive the actuators 33a, 33b to positions corresponding to the combined control signals applied to the servo systems. The actuators 33a and 33b control corresponding injector valves 34a and 34b, which, in turn, control the flow of fuel and oxidizer to the engines 12a and 12b.

The effect of the engines 12a and 12b on the gyroscopic subsystems 20 will depend on a number of factors defining the vehicle dynamics. These factors include principally the vehicle mass and its mass distribution with respect to the location of the engines. This is shown diagrammatically by the block 36, labeled vehicle dynamics, by the broken lines 38a and 38b extending from the engines 12a and 12b to the block 36, and by the broken line 40 extending from the vehicle dynamics block 36 back to the gyroscopic subsystem 20. This diagrammatic representation is intended to shown that operation of the engines affects the sensed attitude angles, in accordance with the vehicle dynamics.

The value of the command angle signal on line 26 will be generated in accordance with the desired attitude of the vehicle. In effecting a propulsion burn to make an orbital transition, for example, it may be desired to maintain the vehicle in such an angular attitude that the propulsion force of the engines is at all times tangential to the orbital arc. In other situations, different considerations may dictate what the desired angular orientation should be. In any event, the system of the invention provides for a constant net forward thrust from the engines, while generating a correction torque to bring the vehicle to the desired angular attitude.

Figure 3:
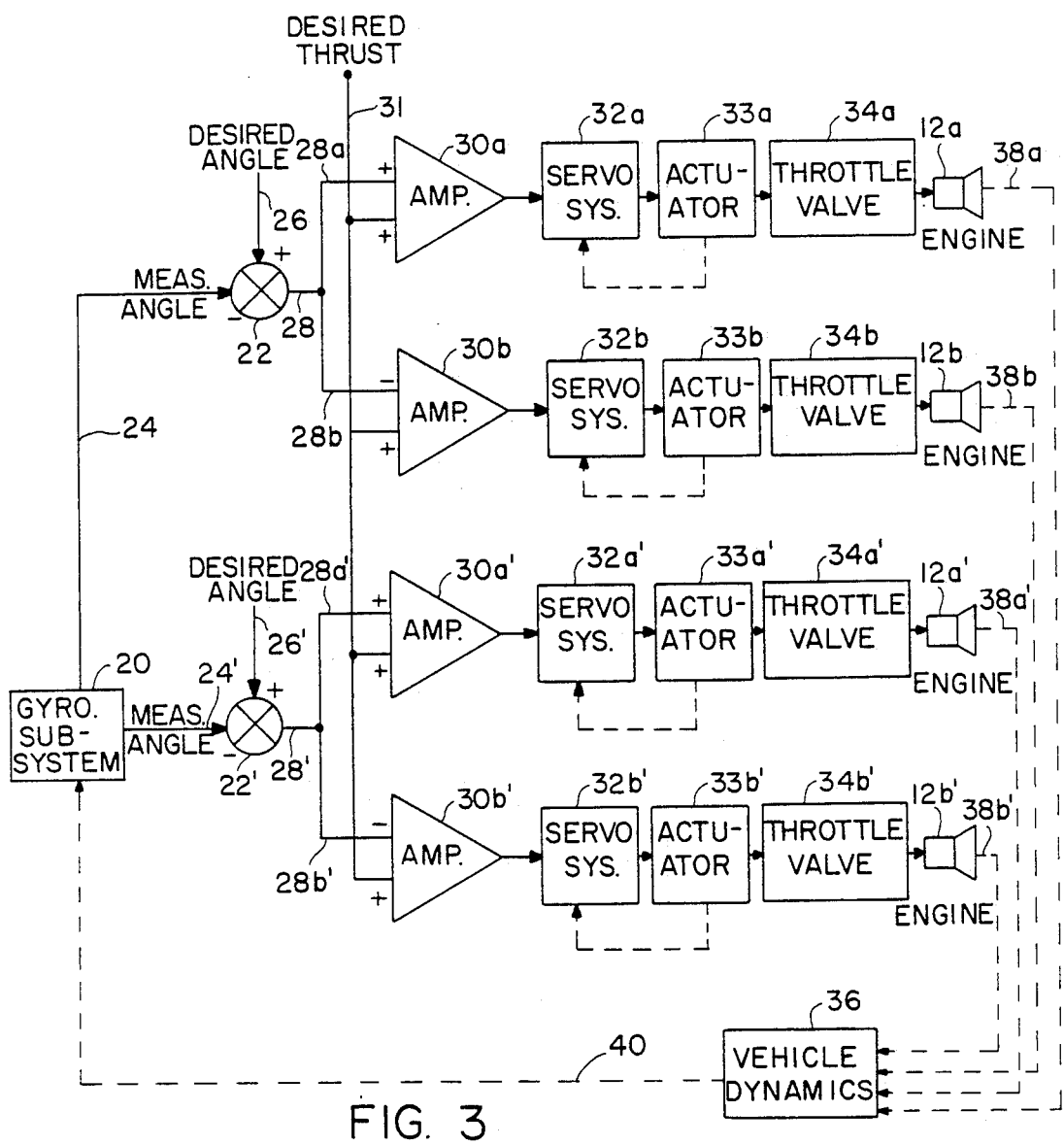
FIG. 3 is a simplified block diagram showing the control system of the invention used in conjunction with two pairs of engines.

As discussed up to this point, the system of the invention is capable of maitaining a desired angular orientation with respect to a particular transverse axis through the vehicle. For complete attitude control, another pair of engines are preferably employed to provide the necessary torque corrections with respect to an orthogonal transverse axis. Such arrangement is shown by way of example in FIG. 3. This is basically a duplication of the block diagram of FIG. 2. The gyroscopic subsystem generates two actual angle signals on lines 24 and 24', and there are two comparators 22, 22' and two command angle lines 26, 26'. Other system components are indicated using primed reference numerals for the second pair of engines and related components. The system as shown generates differential throttled thrusts on two pairs of engines 12a, 12b and 12a', 12b', to control the attitude of the vehicle about two orthogonal axes.

With an appropriate control algorithm, three engines could be employed to control attitude in two axes. Similarly, a number of engines greater than four could be used to provide two-axis control and to provide redundancy for control in the event of an engine malfunction.

Figure 4:
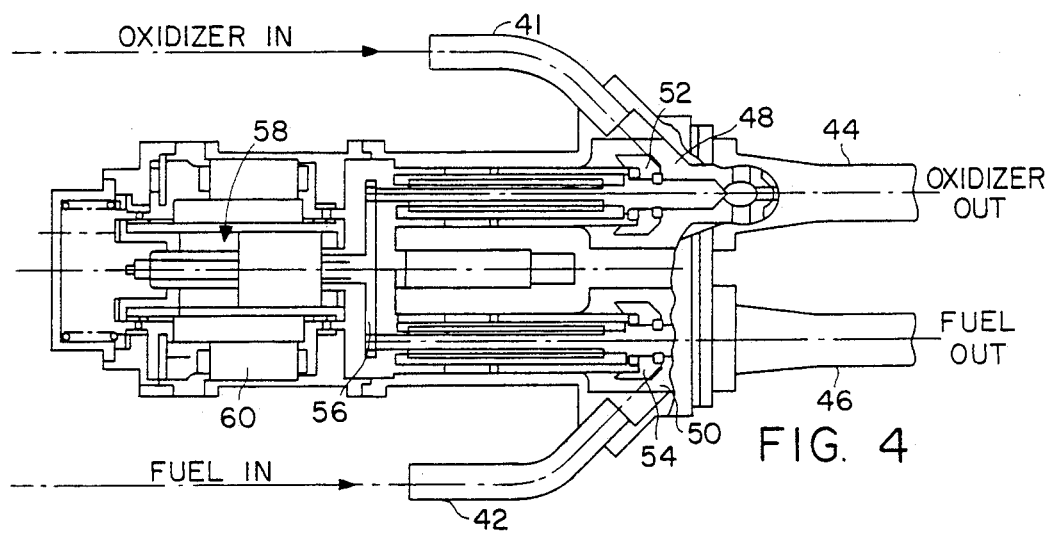
FIG. 4 is a fragmentary sectional view of a thrust modulator valve used in the invention to control the thrust of a bipropellant rocket engine.

FIG. 4 is an exemplary illustration of a thrust modulation valve used in the control system of the invention. The valve has an oxidizer inlet line 41, a fuel inlet line 42, an oxidizer outlet line 44 and a fuel outlet line 46. Flow from the inlet lines to the outlet lines is controlled in response to an electrical input signal to the valve. The inlet lines 41 and 42 communicate with respective valve chambers 48 and 50. The outlet lines 44 and 46 communicate with the same chambers, and flow through the chambers is regulated by the axial position of two needle valves 52 and 54, respectively, which are axially movable within the chambers. The needle valves 52 and 54 are connected to a common yoke 56, which is movable in an axial direction by means of a screw drive 58 coupled to an electric motor 60. The motor cooperates with one of the servo systems 32a, 32b (FIG. 2) and drives the valve to a desired position corresponding to a desired throttle level for the motor. The error signal on lines 28a, 28b is combined with the signal on line 31 corresponding to the desired nominal throttle setting, and applied to the motor servo system 32a, 32b to move the thrust modulator valve to the appropriate setting.

Figure 5:
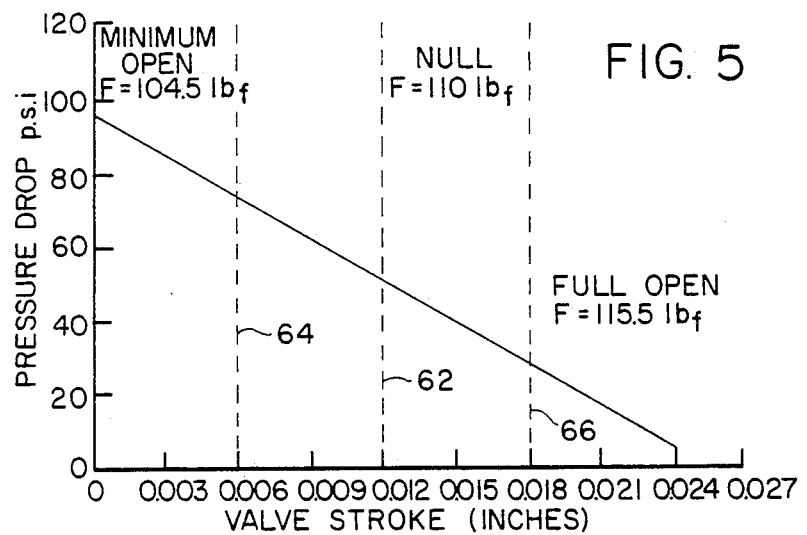
FIG. 5 is a graph showing the thrust modulation characteristics of a rocket engine, specifically the variation in pressure drop as a function of thrust modulator valve stroke position.
Figure 6:
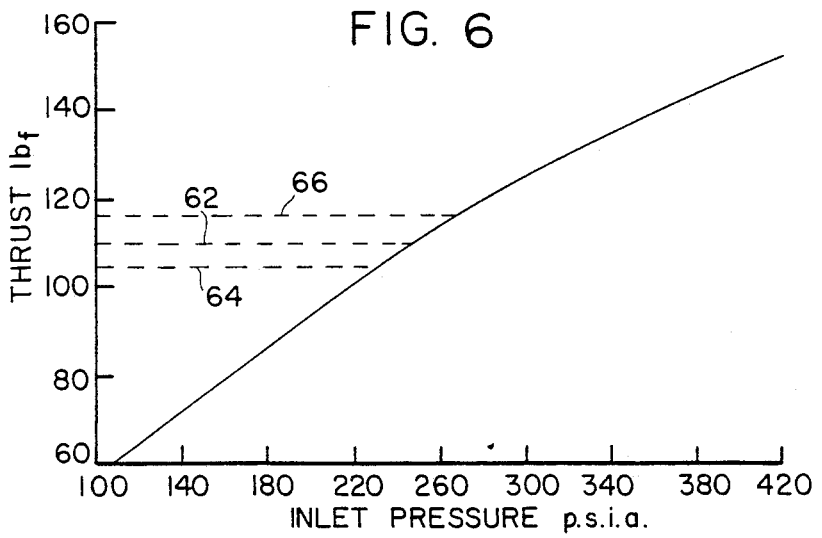
FIG. 6 is a graph corresponding to FIG. 5 and showing the variation of thrust with inlet pressure.

The graphs of FIGS. 5 and 6 show, for a typical engine, the relationship between the axial position of the thrust modulator valve of FIG. 4 and the thrust developed by the engine. FIG. 5 shows the relationship between valve stroke position and the pressure drop developed through the valve. Three valve positions are indicated: a null or nominal position 62 in which the pressure drop is approximately 50 psi, a minimum open position 64 in which the pressure drop is approximately 75 psi, and a full open position 66 in which the pressure drop is approximately 30 psi. It will be observed that, for the range of valve positions shown, the pressure drop varies in a practically linear fashion with the axial position of the valve.

As FIG. 6 shows, the thrust developed by the engine varies in an almost linear fashion with inlet pressure. In the example given in FIG. 4, the thrust is varied from a nominal setting a 110 lb to a maximum of 115.5 lb and a minimum of 104.5 lb. This operating band is shown in FIG. 6 by the region 70 on the curve.

In a typical operating sequence, the vehicle is first placed in a desired attitude prior to firing the propulsion engines. This is accomplished with a conventional "coast mode" attitude control system, which may employ separate small thruster rockets, rotatable flywheels, or other means. This "coast mode" attitude control system will also provide control of the attitude with respect to the axis of the propulsion thrust engines. Before the engines are fired, the thrust modulator valves are placed in the null or neutral position, in the mid-range of throttle modulation. After the engines are fired, attitude control with respect to the two transverse axes is maintained as described above, by differentially modulating the propulsion thrust engines.

It will be appreciated from the foregoing that the present invention represents a significant advance in the field of guidance and control systems for space vehicles. In particular, the invention provides a novel technique for controlling the attitude of the vehicle while its propulsion engines are firing, but without the use of gimbaled engines, auxiliary thrusters or pulsed engine modulation for attitude control. It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. For use in a space vehicle apparatus for controlling the movement of said vehicle to achieve a desired attitude, comprising:
   at lease two propulsion rocket engines positioned approximately on opposite sides of the center of mass of the space vehicle and in parallel relation with one another; said vehicle being subject to a series of guidance control errors caused by each of said engines having a different thrust valve for a given rate of fuel feed, the mass of said vehicle and the distribution of mass of said vehicle relative to the position of said engines on said vehicle;
   means for sensing the attitude of the vehicle,
   means for comparing the sensed attitude of the vehicle with a desired attitude;
   means for inputting to said means for comparing electronic signals representative of the errors of said different thrust values and means for further correcting the input signals in the comparator to compensate for the vehicle mass and its mass distribution with respect to the position of said engines and produce a cumulative electronic correcting signal;
   means responsive to said cumulative electronic correcting signal for differentially throttling the engines continuously over a modulation range whereby the vehicle is rotated and positioned in the desired attitude.

2. Apparatus as defined in claim 1, wherein:
   the means for controlling the thrust of the engines includes for each engine a thrust modulation valve, the position of which controls the flow of fuel to the engine and thereby controls the thrust developed by the engine.

3. Apparatus as defined in claim 2, wherein each thrust modulation valve includes:
   an axially movable valve element, the position of which determines the flow rate through the valve;
   an actuator motor; and
   a screw mechanism for converting rotational movement of the motor into axial movement of the valve element.

4. Apparatus as defined in claim 1, wherein:
   the number of engines is at least four; and
   each pair of engines is differentially modulated to control attitude with respect a separate transverse axis of the vehicle.

5. Apparatus as defined in claim 1, wherein the actuator means includes, for each engine:
   an electric motor;
   screw thread means for converting rotational movement of the motor to linear mechanical movement; and
   means for coupling the linear mechanical movement to the modulator valves.

6. A method for control of a space vehicle to achieve a desired attitude, said vehicle having at least two propulsion rocket engines positioned approximate opposite sides of the center of mass of the space vehicle and in parallel relation with one another; said vehicle being subject to a series of guidance control errors caused by each said of engines having a different thrust valve for a given rate of fuel feed, the mass of said vehicle and the distribution of mass of said vehicle relative to the position of said engines on said vehicle, the method comprising the steps of:

sensing the true angular attitude of the vehicle;

generating electrical signals representative of the different thrust values of each engine and inputting the signals to a comparitor;

correcting the input signals in the comparitor to compensate for the vehicle mass and its mass distribution with respect to the position of said engines;

comparing the true angular attitude of the vehicle with the desired attitude of the vehicle to produce a cumulative electronic correcting signal for differentially throttling the engines continuously over a modulation range whereby the vehicle is rotated and positioned in the desired attitude.

7. A method as defined in claim 6, wherein:
the step of differentially throttling the engines includes actuating a thrust modulation valve, the position of which controls the flow of fuel to the engine and thereby controls the thrust developed by the engine.

8. A method as defined in claim 6, wherein the step of actuating the thrust modulation valve includes:
actuating a an electric motor;
converting the rotational movement of the motor into translational movement; and
translating an axially movable valve element, the position of which determines the flow rate through the valve.

* * * * *